United States Patent [19]

Zuckerman et al.

[11] 4,449,046
[45] May 15, 1984

[54] START OF LINE DETECTION AND SYNCHRONIZATION CIRCUIT FOR OPTICAL SCANNING SYSTEMS

[75] Inventors: Leonard Zuckerman, Dix Hills; Colin Taddonio, Port Jefferson Station, both of N.Y.

[73] Assignee: Litton Systems, Inc., College Park, Md.

[21] Appl. No.: 357,500

[22] Filed: Mar. 12, 1982

[51] Int. Cl.³ ............................................... H01J 40/14
[52] U.S. Cl. ........................................ 250/235; 358/293
[58] Field of Search ...................... 250/234, 235, 236; 350/6.7, 6.8; 358/293

[56] References Cited

U.S. PATENT DOCUMENTS 4,216,378  8/1980  Monette ............................ 250/235
4,290,086  9/1981  Spencer et al. ..................... 358/293

Primary Examiner—David C. Nelms
Assistant Examiner—J. Brophy
Attorney, Agent, or Firm—Robert F. Rotella; Michael H. Wallach

[57] ABSTRACT

A circuit is shown for use within an optical scanning system utilizing at least two scanning beams for scanning a grating and a document. A high frequency reference signal is applied to a counter which also receives the grating signal. The grating signal is delayed by a counter to assure that the grating signal has been synchronized with the reference signal. As the scan across the document hits a reference target, a picture element signal is generated which is also applied to the counter. The counter is enabled upon receipt of a positive going signal from both the reference signal and the picture element reference signal. As the reference signal is a much higher frequency than the picture element signal, any error in misalignment between the grating whose signal is synchronized with the reference signal and the target is eliminated by the high frequency reference signal. A further delay counter within the circuit eliminates errors caused by the width of the target signal. An additional counter is utilized to assure that the scan line signal is terminated at the same point after each successive scan.

9 Claims, 12 Drawing Figures

START OF LINE DETECTION AND SYNCHRONIZATION CIRCUIT FOR OPTICAL SCANNING SYSTEMS

The present invention relates to optical scanning systems and, more particularly, to a circuit which detects the start of a scanning line as a beam of light scans over a document and synchronizes that scanning line with a grating signal generated as a second beam scans across a grating.

BACKGROUND OF THE INVENTION

Current optical scanner such as digital facsimile scanners incorporate a galvanometer which scans a document to be reproduced as a facsimile or reproduced as signals which are transmitted to a remote location and then reproduced as a facsimile. The scanning motion consists of a right to left or left to right scan across the document followed by a retrace, as is well known. The start of each scan generally creates an uncertain start point.

Thus, it becomes important to align information from subsequent scans with the information generated by each preceding scan. In order to do this, prior art optical scanning systems utilize a target, such as a diode, across which the document scanning beam is swept. As the beam strikes the target diode, a signal is generated which may be utilized to align a subsequent beam with each preceding beam.

Generally, the leading edge of the signal generated when the target diode is struck by the light beam was utilized to enable various electronics within the optical scanning system. The signal generated by a scanning line across the document is divided into picture elements (pels) which are read as either a high or low digital signals that represent a finite space. Due to the digital character of the target signal, the method described above creates two distinct disadvantages.

First, if the grating is not exactly aligned to coincide with the target, there is an inherent error of plus or minus one grate of the grating due to the digital character of the grating signal. The tolerance between the alignment of the grate and the target is generally greater than one grating space. Keep in mind that a grating space is generally larger than a picture element and that lateral adjustment of either the target or the grate, in most systems, is impractical. Thus, it is inherently difficult if not impossible to adjust an optical scanning system to be more accurate at the start of scan than plus or minus one grating element. Further, the long term drift of the system makes such an adjustment, even if practical, impossible to retain over an extended period of time.

The second disadvantage of enabling the optical scanning system electronics on the leading edge of the target is that the target has a finite width. Therefore, a given number of picture elements corresponding to the target width are not available to carry data. The result is that the actual number of data contained picture elements is less than the apparent number.

SUMMARY OF THE INVENTION

Accordingly, it is an object of the present invention to eliminate the plus or minus one grate element uncertainty found in prior art scanning systems.

Another object of the present invention is to eliminate problems of critical alignment and long term instability Still a further object of the present invention is to provide a scanning system which is capable of transmitting a full scan line of picture element data while accurately detecting the beginning of a scan line.

A still further object of the present invention is to provide circuitry for use within an optical scanning system which accurately detects the beginning of a scan line and synchronizes a subsequent scanning line precisely with previously scanned lines.

In accomplishing these and other objects, there is provided within an optical scanning system having at least two scanning beams, including a first beam for scanning a grating and a second beam for scanning a document, a circuit which utilizes two beams to produce an accurate start of line detection and synchronization between the grating and document.

The grating scanning beam contacts a first grate for generating a grating signal including a first grate detect signal which is applied to a phase locked loop circuit for starting a reference signal that is then synchronized with the grating signal. Subsequently, the document scanning beam contacts a target which generates a signal that is applied to circuitry and combined with the first grate detect siganl to enable a divider. The reference signal from the phase locked loop applied to the divider has a frequency substantially higher than the frequency of the signal representing the picture elements. Thus, when both signals go high to enable the counter, the high signal representing the picture element can not be missed as the signal representing the loop goes high several times during but one picture element signal. A second divider converts the signal from the first divider to a signal whose frequency is equal to the frequency of the picture elements and applies this signal to a counter which delays a predetermined number of picture elements before enabling a picture element gate and a counter.

Through the utilization of the first divider that generates a high frequency signal, the picture element gate counter is started at a point in time which is independent of any errors found between the alignment of the grate and the target. The reason for this, is that any misalignment is eliminated in the first or second pulse of the high frequency signal applied to the first divider. Thus, any error is eliminated before it has a chance to affect the value of the first picture element. The second dividing circuit and delay counter eliminates any problems caused by the width of the target to assure that the beginning of the picture element scan always contain picture data and starts at the same point in exact synchronization with the grating signal due to the phase locked loop.

The picutre element gate counter, besides assuring that the first picture element contains data, assures that the scan line is filled with data and terminated at the exact point after each scan. After the count within the picture element gate exceeds a predetermined value, a reset signal is generated which resets the complete circuit described herein.

DESCRIPTION OF THE DRAWINGS

Other objects and further advantages of the present invention will become apparent to those skilled in the art after a careful consideration of the following specification and accompanying drawings wherein.

DESCRIPTION OF THE PREFERRED EMBODIMENT

Figure 1:
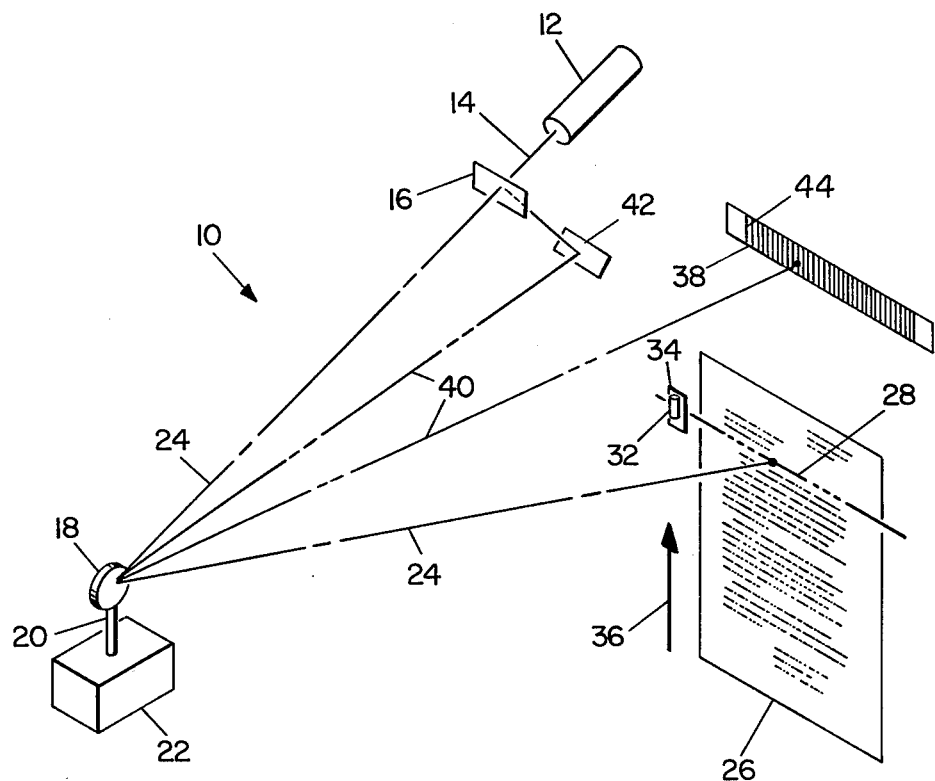
FIG. 1 is a mechanical schematic diagram of an optical scanning system utilizing the start of line detection and synchronization circuit of the present invention.

Referring now to FIG. 1, an optical scanning system is shown generally at 10 including a source of electromagnetic energy which, in this embodiment, is a laser 12. The laser may include a laser rod driven by a flash lamp, not shown, whose radiation is amplified by appropriate reflective mirrors and focused into a very narrow, intense beam of coherent light 14, as is known. The beam of coherent light is passed through a partially reflective mirror 16 onto galvanometer mirror 18 mounted upon a suitable shaft 22 driven by a galvonometer coil and suspension system, as shown schematically at 22.

The partially reflective mirror 16 permits the beam of coherent light 14 to pass therethrough for forming a first beam 24 which is reflected from the mirror 18 upon a document 26. As the galvonometer is deflected by its coil within a magnetic field, not shown, the mirror 18 causes the beam 24 to scan across the document 26 from left to right, in the embodiment shown, for forming a document scanning beam 28.

As the beam 24 starts to scan across the document scanning line 28, it first encounters a target 32 which may be formed by a light sensitive diode chip placed upon a substrate 34. It can also be generated by a simulated target pattern that produces a reflection similar to the reflection caused by the document when intercepted by the scan beam. The reflection from the target can then be detected by the same means as the reflection from the original document. In the embodiment shown, the scanning beam moves from left to right across document 26 along the scan line 28. the document may be moved by suitable mechanical drive means, not shown, in the direction illustrated by the arrow 36. The scanning beam 28 traces quickly across the document 26 to the end of the scan line and then retraces to the point of beginning to repeat the scanning of subsequent lines. A typical document may be scanned as many as 150 to 200 lines per inch. Each scan line is divided into picture elements or pels. In a typical scan line, there may be as many as 150 to 200 pels per inch. Thus it will be understood that an optical scanning system basically divides the documents to be scanned into a finite area or pel and determines whether each pel should be transmitted as a high or low signal represents a white or black space. The determination of whether to transmit the space as a high or low signal is made by an optical reader, not shown.

To determine exactly where the scan beam 24 is upon the scan line 28, it is necessary to provide an accurate reference. In the present embodiment, this is accomplished through the utilization of a grating 38 which is scanned by a second beam of coherent light 40 formed by the partially reflective mirror 16 which reflects some of the energy from beam 14 upon a second mirror 42. The mirror 42 is aligned to reflect its beam 40 upon the galvanometer mirror 18. The mirror 18 reflects the beam 40 upon the grating 38 at the same angle as it reflects the beam 24 upon the document 26. As the beam 40 begins to sweep across the grating 38, it contacts a first grate 44 which may be one of several hundreds of grates formed upon the grating 38 by printing, etching or other suitable methods. A typical grating may include as many as 75 to 100 grates per inch. It should be noted that in most optical scanning systems the number of grates is typically less than the number of pels or picture elements.

Upon contacting the first grate 44, beam 40 generates a grating signal as shown in FIG. 3b at 46. The first grate 44 generates a first grate signal 48 which has an amplitude substanitally higher than the amplitude of the remaining grating signals 46. This first grate signal is utilized by a detector circuit to generate a positive going signal shown in FIG. 3c which may be applied to a terminal 50, FIG. 2.

The circuit which generates the first grate signal shown in FIG. 3c is shown in a copending patent application by David R. Spencer and Leonard Zuckerman entitled First Grate Detector for An Optical Scanning System, Ser. No. 160,776, filed June 18, 1980 and assigned to the same assignee as the present invention.

Figure 2:
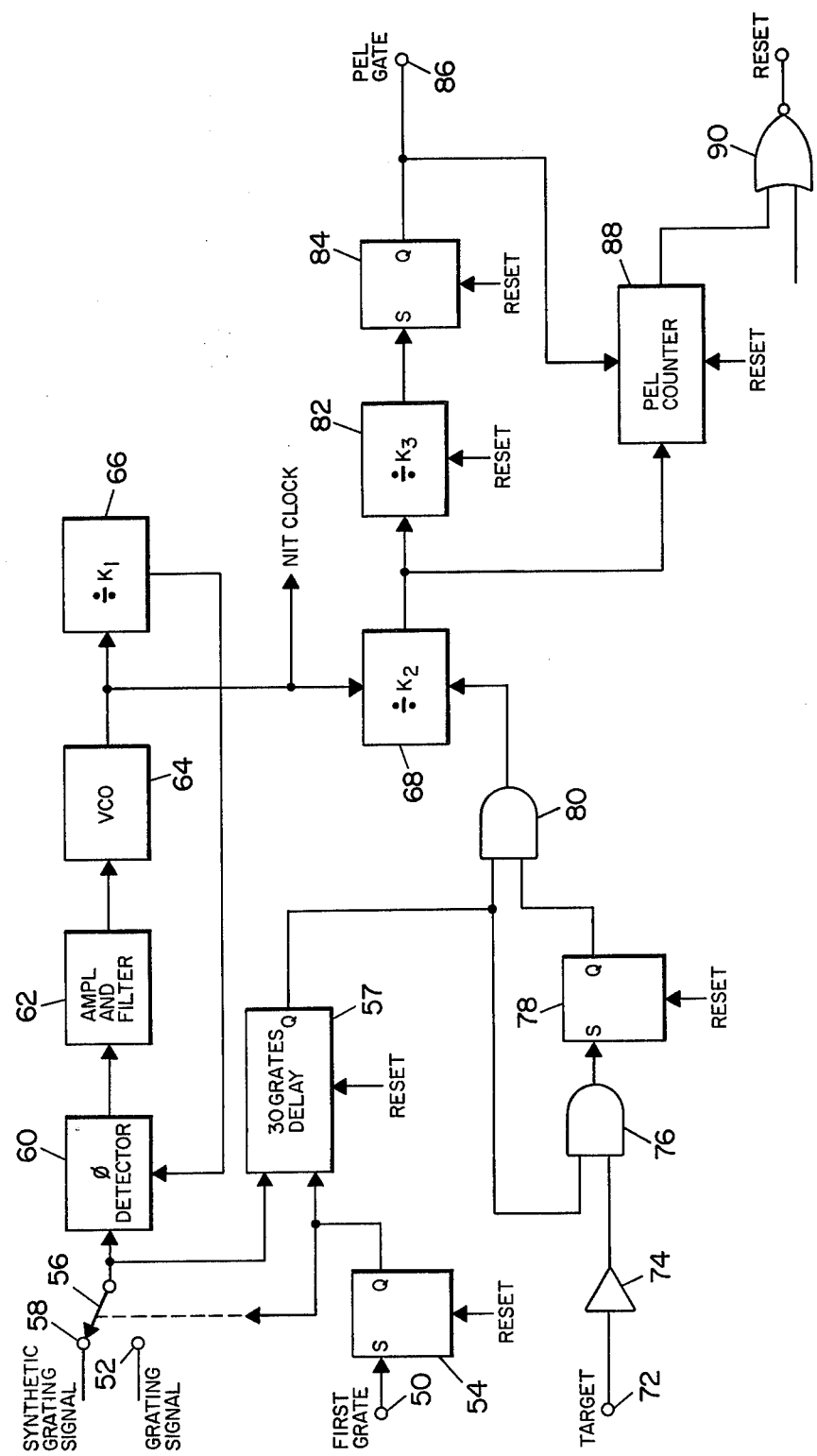
FIG. 2 is an electrical schematic diagram showing the circuit of the present invention.

Referring now to FIG. 2, the start of line detection and synchronization circuit will be described in greater detail. The grating signal 46 including the first grate signal 48 is applied to a terminal 52 while the first grate signal shown in FIG. 3c is applied to terminal 50. The leading edge of the signal applied to terminal 50 is applied to a flip flop 54, whose high going output energizes a selector switch 56 and to a delay counter 57 to be described hereinbelow. The switch 56 is then changed from a synthetic grating signal terminal 58 to the grating signal terminal 52. The common terminal of switch 56 is connected to an input of a phase detector circuit 60 whose output is applied to an amplifier and filter circuit 62 and then to a voltage controlled oscillator 64. The output of voltage control oscillator 64 is a high frequency signal which is applied to a feedback counter 66 as well as a first counter 68. The output itself may be used as a clock for a so called nit signal which is a smaller area division of a pel that can be used when the optical scanning system produces a facsimile that incorporates varying shades of grey.

The feedback counter 66 undergoes a change of state after a predetermined number of counts so that the high frequency signal from the voltage controlled oscillator 64 is in effect divided by a first constant $K_1$. The output of counter 66 has a frequency that is equal to the frequency of the grating signal applied to terminal 52. The output of counter 66 is thus applied as a reference signal back to the phase detector circuit 60. The phase detector 60 thus receives two inputs; first, from switch 56 and, second, from counter 66. The synthetic grating signal applied from terminal 58 to the phase detector 60 runs the phase locked loop established by detector 60, amplifier 62, voltage control oscillator 64 and feedback counter 66 at a frequency substantially identical to the frequency which 38. This frequency is illustrated generally in FIG. 3a at 70.

Once the first grate 48 is detected and the first grate signal applied to terminal 50, the switch 56 is placed in its alternate position wherein the actual grating signal 46 is applied at terminal 52 to the detector 60. As illustrated schematically in FIG. 3a, the synthetic grating signal 70 is replaced with the grating signal 46. The grating signal 46 will have a frequency approximately equal to the synthetic grating signal 70 but, as is understood by those skilled in the art, may be out of phase with that signal. The function of the phase locked loop and the feedback signal from counter 66 is to sychronize the signal generated thereby with the grating signal. In an example of the present embodiment, this synchronization takes place in less than 30 grates.

Accordingly, the output of flip flop 54 enables a delay counter 57 which counts 30 grates at which time the Q terminal goes high as shown in FIG. 3d. This delay assures synchronization before the target 32 is struck by beam 24 to generate a target signal 71, FIG. 3e.

The signal formed by the scan of beam 24 across the document 26, FIG. 3e, is applied to a terminal 72 which connects to the input of a target signal detector 74 whose output is connected to one terminal of an AND gate 76. The second terminal of AND gate 76 also receives the Q output of counter 57 which went high previously, generating a high or positive signal, FIG. 3f, which is applied to the S terminal of a flip flop 78. The flip flop 78 immediately produces a postive output at the Q terminal which is applied to a second AND gate 80 whose second gate has already received the positive signal, FIG. 3d, from counter 57. The resultant high output of AND gate 80 is then applied to the couner 68. Counter 68, like counter 66, is designed to undergo a change of state output after a count of a predetermined number of positive inputs.

Figure 3:
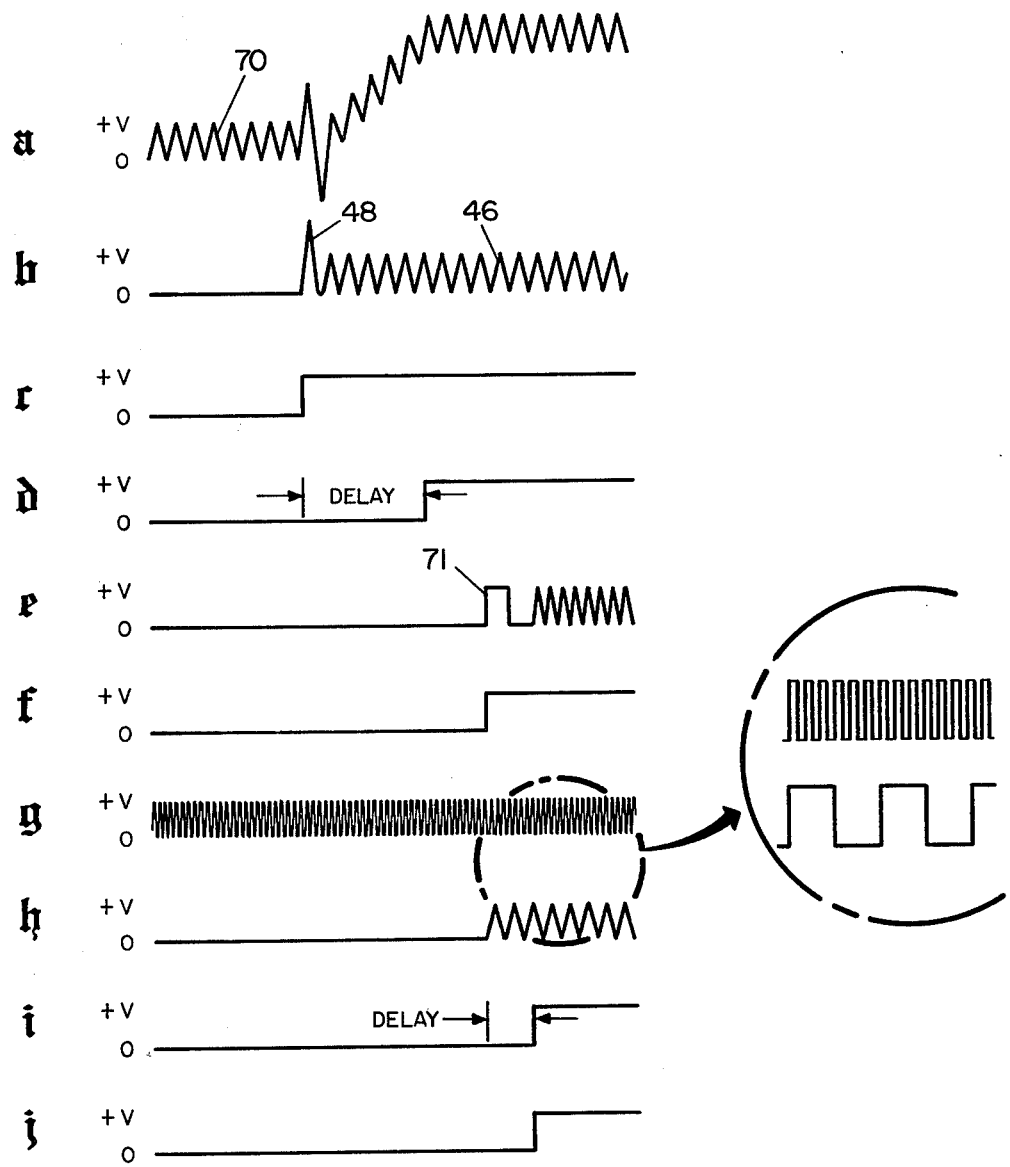
FIGS. 3a, 3b, 3c, 3d, 3e, 3f, 3g, 3h, 3i and 3j are a set of waveforms generated by the circuit shown in FIG. 2.

The high frequency signal from the voltage control oscillator 64 applied to one input terminal of counter 68 is shown in FIG. 3g whereas the target signal processed by the previously described grating functions enables counter 68 to divide the nit clock freuency by a factor $K_2$. As shown in the expanded detail of FIG. 3, the counter 68 is enabled upon receipt of the enable signal from AND gate 80. Thus, the counter 68 is enabled to divide the frequency of the VCO to produce an output upon receipt of the output of AND gate 80. Should there be a misalignment between the grate 38, the lower frequency grating signal generated thereby, FIG. 3b, and the target signal (71), the resultant error will be less than $1/K_2$ parts of a picture element. Therefore, the misaligment of the target diode 32 with the grating 38 is corrected without affecting the preliminary picture element signal shown at FIG. 3h. In this manner, the optical scanning system remains synchronized at all times after detection of the start of scan line. Further, as will be described, there is no loss of the first picture element.

The counter 68 divides the signal from the voltage control oscillator 64 by a constant $K_2$. The output frequency of 68 is equal and in phase with the picture elements. This output is applied to delay counter 82. Delay counter 82 counts a precise number of pre-pels representing a spacial distance greater than the width of the target 34. This delay count is $K_3$. Delay counter 82 then triggers flip flop 84 at the S terminal which produces a high going signal at the Q terminal, FIG. 3i. The output of flip flop 84 is applied to an output terminal 86 which is known as the pel gate signal, and to a pel counter 88 to enable that counter. Counter 88 is connected to the dividing counter 68 for counting pel signals after the pre-pel delay $K_3$ in counter 82. After a predetermined number of counts have been received by the counter 88, a signal is generated which is applied to an input terminal of a NOR gate 90 whose output generates the reset signal for resetting counters 54, 57, 78, 82 and 84.

In operation, the start of scan detector and synchronization circuit provides a delay for a sufficient length of time to enable the voltage control oscillator within the circuit to become synchronized with the grating signal generated by the first scanning beam 24. After this delay, a signal is generated from counter 57 which enables the circuit to look for and receive the positive going signal 71 generated from the target 32. The combination of the two positive signals from counter 57 and terminal 72 are applied to AND gate 76 and then to AND gate 80 to enable the counter 68. The counter 68 immediately responds by dividing frequency of VCO 64 and prodcuing a pel-frequency in precise phase with the target. Thus, the output of the detector and synchronization circuit is accurately synchronized upon receipt of the first pel and there is no error created by misalignment of the grate 38 and target diode 32.

As the signal generated by the diode 32 has a finite width the error generated by this width is eliminated by a second delay established by the dividing flip flop 82 and counter 84 whose output is applied as a positive signal to the pel counter 88. Once enabled, pel counter 88 begins to count the output from counter to a predetermined number at which time the pel gate counter 88 disables the entire circuit by resetting the circuit for the next scan. Therefore, the start of scan and end of scan are accurately determined by the signal 71 generated from the target 32. Further, the width of that signal does not limit the amount of information available during each document scan since transmission is delayed until after the target diode signal has passed.

The present invention has been described as utilizing a laser to generate a beam of coherent light. However, other sources of electromagnetic energy may also be used within the present invention. Further, the number of scan lines, pels or grates per inch may be varied while practicing the present invention. While the counter and gate arrangement described functions nicely to provide a scan detector and synchronization of circuit, it will be apparent to those skilled in the art that other modifications and variations of the present invention are available. Accordingly, the present invention should be limited only by the appended claims.

We claim:

1. A start of line detection and synchronization circuit for use in an optical scanning system utilizing a grating scanning beam which generates a grating signal and a document scanning beam which generates a picture element signal as said scanning beam scans over a scan line having a reference target in said scan line comprising:
   oscillator means which generate an oscillator signal;
   means for detecting a first grating signal and connecting said grating signal to said oscillator means;
   means for synchronizing said grating signal with said oscillator signal.
   first counter means driven by said oscillator signal;
   means for detecting said reference target in said scan line to enable said first counter means after synchronization of said oscillator and said grating signals; and
   second counter means driven by said first counter means for, after a predetermined delay count, generating a start of line signal.

2. A start of line detection and synchronization circuit for use in an optical scanning system, as claimed in claim 1, additionally:
   third counter means enabled by said start of line signal from said second counter means and connected to said first counter means for counting the output therefrom and disabling said picture element signal at the end of a scan line.

3. A start of line detection and synchronization circuit for an optical scanning system, as claimed in claim 1, wherein:
said means for detecting a first gratin signal include a counter connected to receive said picture element signal whose output is connected to said first counter and delayed by a predetermined count therein to produce an output combined with a signal from said means for detecting said reference target to enable said first counter means after said delay.

4. A start of line detection and synchronization circuit for an optical scanning system, as claimed in claim 3, wherein:
said first counter is a high freuency counter driven by said oscillator;
said picture element signal applied to enable said first counter is a lower frequency signal wherein any misalignment of said picture element signal and said grating signal is eliminated by said high frequency.

5. A start of line detection and synchronization circuit for an optical scanning system, as claimed in claim 1, wherein:
said oscillator means is a voltage control oscillator;
said means for synchronizing is a phase locked loop including said oscillator;
said first counter means is a high frequency counter connected to said oscillator.
said second counter means is a divider and lower frequency counter which substantially equals the frequency of said picture element signal wherein said high frequency counter generates an enabling signal for said start of line signal which is insensitive to phasing differences between said grating and picture element signals.

6. A start of line detection circuit for use in an optical scanning system utilizing a grating scanning beam which generates grating signals and a document scanning beam which generates picture element signals as said beam scans over a line on said document having a reference target located in the path of said document scanning beam, comprising;
means for detecting a first grate signal of said grating signals;
means for generating a reference signal having a frequency higher than said grating signals;
means for detecting said reference target in said path of said document scanning beam;
picture element gate means;
gate means enabled by said means for detecting a first grate signal and said means for detecting said reference target for connecting said high frequency reference signal to said picture element gate means wherein said picture element gate means is enabled to receive a first of said picture element signal without loss of said first picture element signal.

7. A start of line detection circuit for use in an optical scanning system, as claimed in claim 6, wherein:
said means for generating a reference signal includes a voltage controlled oscillator within a phase locked loop having a feedback signal whose frequency is equal to the frequency of said grating signals for synchronizing said reference signal to said grating signals within a predetermined number of grating signals;
said means for detecting a first grate signal includes delay means which delay said enabling of said gate means until after said predetermined number of grating signals to assure synchronization of said picture element signals and said grating signals.

8. A start of line detection circuit for use in an optical scanning system, as claimed in claim 6, additionally comprising:
counter means connected from said gate means to said picture element gate means to delay enabling of said picture element gate means until after said reference target is fully scanned by said document scanning beam.

9. A start of line detection circuit for use in an optical scanning system, as claimed in claim 6, wherein:
said picture element gate means includes a counter to count said picture element signals and disable said means for detecting a first grate signal, said means for detecting said reference target and said picture element gate means at the end of a scan line.

* * * * *